Patented Dec. 22, 1925.

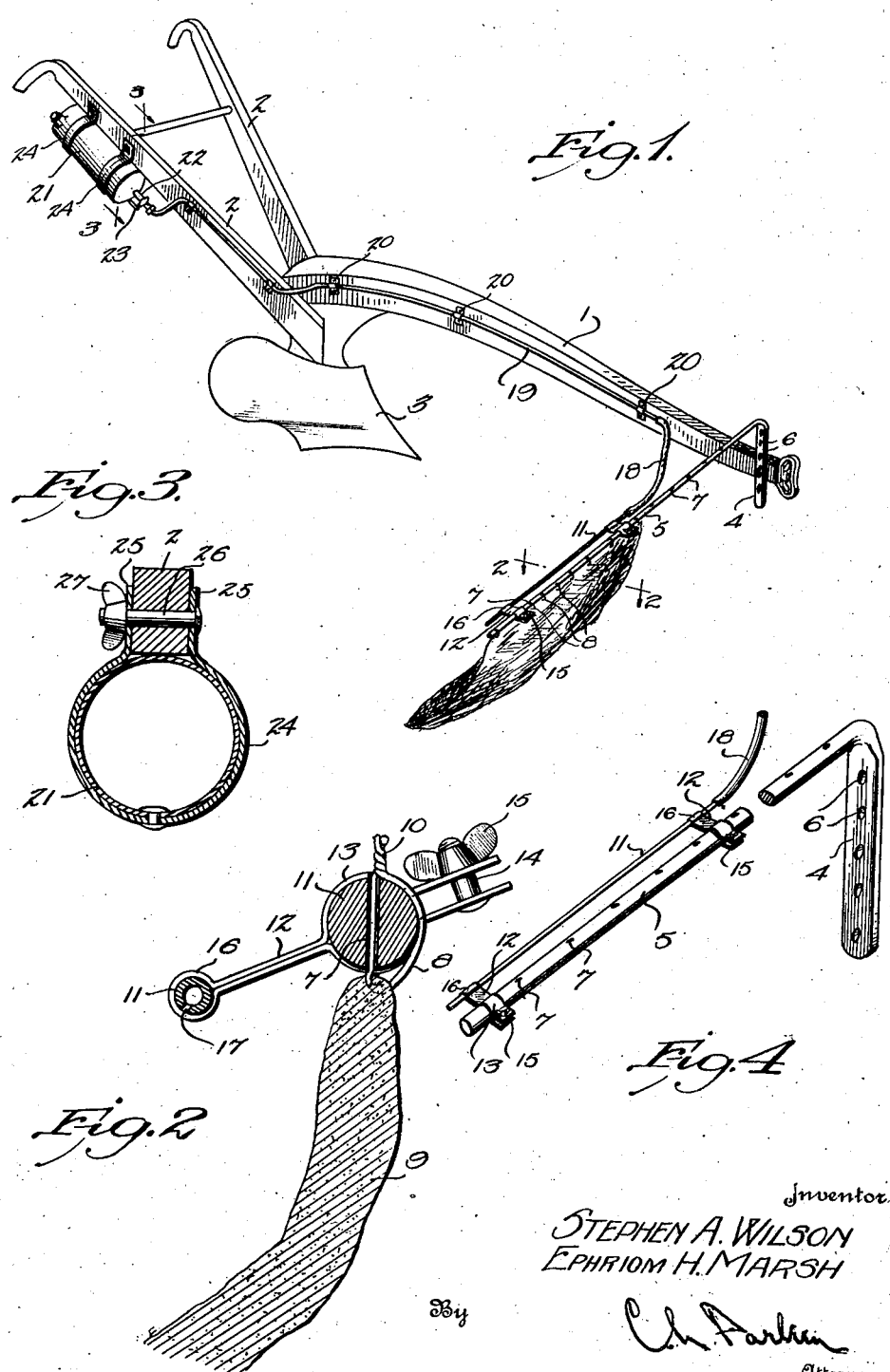

1,566,714

UNITED STATES PATENT OFFICE.

STEPHEN A. WILSON AND EPHRIOM H. MARSH, OF EGYPT, GEORGIA.

INSECT EXTERMINATOR.

Application filed August 6, 1924. Serial No. 730,497.

*To all whom it may concern:*

Be it known that we, STEPHEN A. WILSON and EPHRIOM H. MARSH, citizens of the United States, residing at Egypt, in the county of Effingham and State of Georgia, have invented certain new and useful Improvements in Insect Exterminators, of which the following is a specification.

This invention relates to insect exterminators, and more particularly to boll weevil exterminators.

An object of the invention is the provision of a simple device for distributing a liquid exterminator over growing plants, which device may be secured to a plow or other implement and the liquid distributed at the same time the field is cultivated.

A further object is the provision of means for adjusting the device laterally of the implement.

A further object is the provision of a supporting member adapted to receive the end of a liquid feed pipe and also form a support for a sheet of fabric or similar material which sweeps over the plants and deposits the liquid thereon.

In the accompanying drawings, we have shown one embodiment of the invention. In this showing:

Figure 1 is a perspective view of a plow showing the invention applied,

Figure 2 is a vertical sectional view on line 2—2 of Figure 1,

Figure 3 is a detail sectional view on line 3—3 of Figure 1, and,

Figure 4 is a perspective view of the supporting member and the end of the feed pipe.

Referring to the drawings, the reference numeral 1 designates a plow beam having the usual handles 2 arranged at the rear thereof and provided with a plow share 3.

The device forming the subject matter of the present invention consists of a supporting rod which is substantially L-shaped having a vertical arm 4 which is adapted to be secured to the plow beam adjacent its forward end and having a horizontal arm 5 extending laterally from the beam. As shown, the arm 4 is provided with a plurality of spaced openings 6, one of which is adapted to receive a bolt passing through the plow beam to permit vertical adjustment of the supporting member. The horizontal arm is also provided with a series of spaced openings 7, and these openings are adapted to receive wires 8 which support a fabric sheet 9. As shown, the wires extend around the arm and their ends are curled, as at 10. A liquid distributing pipe 11 is also supported by the arm 5. As shown, clamps 12 are arranged on the arm, the clamps consisting of a strip of material bent to form a pair of parallel arms and each arm is provided with a substantially semi-circular portion 13, adapted to surround the rod. The ends of the clamps are fastened to each other by means of a bolt 14, passing through suitable openings therein and adapted to receive a wing nut 15. The intermediate portion of the clamp surrounds the liquid distributing pipe, as at 16. As shown, (see Figure 2), the pipe is provided with a plurality of openings 17 on its under side through which the liquid is delivered to the fabric 9. A rubber hose 18 is connected to the inner end of the distributing pipe and this hose is connected to a flexible pipe 19, which extends along the plow beam and up one of the handles. The pipe 19 is secured to the plow beam and the handle by means of clamps 20. The upper end of the flexible pipe is connected to a tank 21. As shown, the tank is provided with an outlet 22, having a valve 23 arranged therein. The tank is secured to the plow beam by means of suitable clamps 24, which surround it and extend upwardly on opposite sides of the handle, as at 25. A bolt 26 extends through an opening in the handle and through openings in the arms 25 and a wing nut 27 is arranged on the bolt.

The operation of the device will be apparent from the foregoing description. The apparatus is first assembled on the plow or other implement and a suitable liquid, such as kerosene, placed in the tank 21. The valve 23 regulates the flow of liquid and the liquid passes through the pipe 19 and the hose 18 to the distributing pipe 11. The liquid thence passes through the opening 17 and falls upon the burlap, or other fabric, 9. As the plow is moved through the field, the fabric sweeps over the plants and deposits the liquid thereon. The supporting member may be adjusted vertically by changing the position of the bolt in the openings 6 of the vertical arm and the distributing pipe may be adjusted laterally of the arm 5 for different types of work. The distributing pipe is rigidly secured to the portions 16 of the clamps and is adapted to move therewith. By applying a slight amount of pressure to the outer clamp, the distributing pipe and clamp may be moved laterally of the supporting arm. After the distributing pipe has been properly arranged, the fabric may be secured to the supporting arm and the arm is provided with the plurality of openings 7 for this purpose.

It is to be understood that the form of our invention herewith shown and described is to be taken as a preferred example of the same, and that various changes in the shape, size, and arrangement of parts may be resorted to without departing from the spirit of the invention or the scope of the subjoined claims.

We claim:

1. A boll weevil exterminator comprising a substantially L-shaped supporting member adapted to be secured to an agricultural implement and extend laterally therefrom, a sheet of fabric secured to said arm and depending therefrom, clamps mounted on said supporting member, said clamps being laterally adjustable, a perforated pipe carried by said clamps, a tank adapted to be mounted on the implement, and a conduit connecting said pipe and said tank.

2. A boll weevil exterminator comprising a substantially L-shaped supporting member adapted to be secured to an agricultural implement and extend laterally therefrom, the laterally extending portion of said supporting member being provided with spaced openings, fastening elements mounted in said openings, a sheet of fabric secured to said fastening elements and depending therefrom, clamps mounted on said supporting member and capable of lateral adjustment, a perforated pipe carried by said clamps, a tank adapted to be mounted on the implement, and a conduit connecting said pipe and said tank.

In testimony whereof, we affix our signatures.

STEPHEN A. WILSON.
EPHRIOM H. MARSH.